United States Patent [19]
Augustin

[11] Patent Number: 5,476,245
[45] Date of Patent: Dec. 19, 1995

[54] PRESSURE-COMPENSATED SOLENOID VALVE

[75] Inventor: Ulrich Augustin, Kernen, Germany

[73] Assignee: Mercedes-Benz AG, Stuttgart, Germany

[21] Appl. No.: 349,199

[22] Filed: Dec. 5, 1994

[30] Foreign Application Priority Data

Dec. 13, 1993 [DE] Germany .......................... 43 42 398.1

[51] Int. Cl.$^6$ .................................................. F16K 31/06
[52] U.S. Cl. .................. 251/129.02; 239/93; 239/533.8; 251/30.05; 251/129.07; 251/129.16
[58] Field of Search ................. 251/129.02, 129.07, 251/129.16, 30.05, 282; 239/93, 533.8, 124

[56] References Cited

U.S. PATENT DOCUMENTS

| | | | |
|---|---|---|---|
| 647,706 | 4/1900 | Robertshaw | 251/282 |
| 2,543,010 | 2/1951 | Gardner | 251/129.07 |
| 3,253,615 | 5/1966 | Armstrong | 251/30.05 X |
| 4,618,095 | 10/1986 | Spoolstra | 239/93 X |
| 4,776,518 | 10/1988 | Yamamoto | 239/533.8 X |
| 5,007,584 | 4/1991 | Rossignol | 251/30.05 X |

FOREIGN PATENT DOCUMENTS

| | | |
|---|---|---|
| 0309797 | 4/1989 | European Pat. Off. . |
| 3732553 | 4/1989 | Germany . |
| 1464700 | 2/1977 | United Kingdom . |

*Primary Examiner*—Stephen M. Hepperle
*Attorney, Agent, or Firm*—Klaus J. Bach

[57] ABSTRACT

In a pressure-compensated solenoid valve disposed in a passage for controlling communication therethrough a central valve housing part which includes a guide bore with an increased-diameter end section providing for a bore shoulder and a stepped control rod movably disposed in the guide bore and having an increased-diameter end portion received in the increased-diameter guide bore end section and a shoulder disposed opposite the guide bore shoulder so as to define an annular space therebetween, a first housing end part is disposed on the central housing part adjacent said increased-diameter guide bore and has an opening in alignment with the control rod and a second housing end part is disposed on the central housing part opposite the first housing end part and includes biasing means for biasing the control rod onto the opening in the first housing end part for closing the opening and electromagnetic means are provided for retracting the control rod to establish communication through the opening wherein the increased-diameter control rod section has a passage in alignment with the opening and extending to the annular space between the two shoulders to exert on the control rod a pressure force compensating for the force applied thereto by fluid at the opening controlled by the control rod.

5 Claims, 1 Drawing Sheet

PRESSURE-COMPENSATED SOLENOID VALVE

BACKGROUND OF THE INVENTION

The invention relates to a pressure-compensated solenoid valve for controlling the passage of a connecting line between a high-pressure side and a low-pressure side of a fuel injection nozzle.

Solenoid valves of this kind are generally intended for use in internal combustion engines with high engine speeds and with highly stressable high-pressure connections between fuel injection pumps and injection nozzles. Extremely rapid switching processes with a minimal application of energy can be carried out with these solenoid valves. The use of such valves is shown, for example, in application Ser. No. 08/342,606 assigned to the assignee of the present invention.

DE 37 32 553 A1 discloses a solenoid valve of this type in which a step-shaped control piston can be displaced in a step-shaped guide bore in a multi-part valve housing. The control piston is provided with an annular recess between the piston portions of different diameters, the enlarged piston portion having a tapered portion axially adjacent the recess in order to form a sealing edge. Above the sealing edge, a high-pressure line opens radially into an annular space which is in communication, only in the open position of the control slide, with a low-pressure line which opens radially into an annular recess between the two piston portions. In addition, an actuation rod is screwed into the control piston which is of hollow design and a flat armature is attached to the free end of the actuation rod.

It is the object of the invention to provide a solenoid valve of this type with pressure compensation and to do this in a simple fashion without adversely affecting safe seating of the valve in spite of the high pressures effective in the valve.

SUMMARY OF THE INVENTION

In a pressure-compensated solenoid valve disposed in a passage for controlling communication therethrough a central valve housing part which includes a guide bore with an increased-diameter end section providing for a bore shoulder and a stepped control rod movably disposed in the guide bore and having an increased-diameter end portion received in the increased-diameter guide bore end section and a shoulder disposed opposite the guide bore shoulder so as to define an annular space therebetween, a first housing end part is disposed on the central housing part adjacent said increased-diameter guide bore end and has ah opening in alignment with the control rod and a second housing end part is disposed on the central housing part opposite the first housing end part and includes biasing means for biasing the control rod onto the opening in the first housing end part for closing the opening and electromagnetic means are provided for retracting the control rod to establish communication through the opening wherein the increased-diameter control rod section has a passage in alignment with the opening and extending to the annular space between the two shoulders to exert on the control rod a pressure force compensating for the force applied thereto by fluid at the opening controlled by the control rod.

The arrangement according to the invention provides all the advantages with a minimal constructional outlay for the solenoid valve, in particular by using extremely simple means for the pressure compensation which is made possible by the arrangement of a special annular space between the control rod shoulder and the guide bore shoulder in cooperation with the passage arrangement in the control rod and the high-pressure-side passage. The flat seat ensures a reliable seal seat.

In an embodiment for a 3-way flat seat valve, full pressure compensation is provided for both in the closed position and in the open valve position.

DESCRIPTION OF THE PREFERRED EMBODIMENTS

Figure 1:
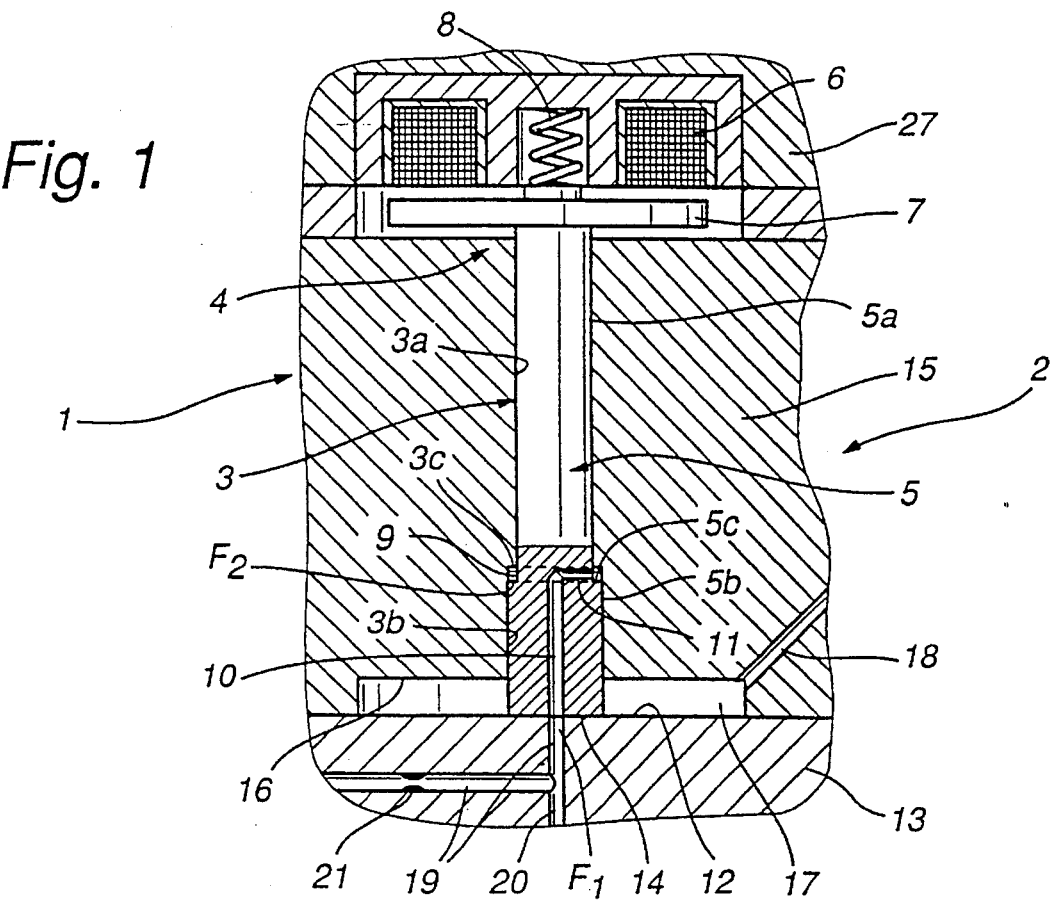
FIG. 1 shows a 2-way flat seat solenoid valve according to the invention.

A pressure-compensated solenoid valve 1, which is constructed according to FIG. 1 as a 2-way flat seat valve, comprises a multi-part valve housing 2 with stepped guide bore 3 extending through a central housing part 15 and a valve closing element 4 with step-shaped control rod 5 slidably disposed in the guide bore 3 and an electromagnet 6 with a flat armature 7 mounted to the narrow, elongate control rod 5.

The step-shaped guide bore 3 has stepped bore portions 3a, 3b which have different diameters and in which rod portions 5a, 5b of the step-shaped control rod 5 are guided so as to be displaceable against the force of a return spring 8, the rod portions 5a and 5b being appropriately matched to the bore 3 and thus also having different diameters. At the junction between the two stepped bore parts 3a, 3b there is a pressure shoulder 3c and at the junction between the two rod portions 5a, 5b there is a pressure shoulder 5c, the two pressure shoulders 3c, 5c being arranged at a distance from one another so as to bound in axial direction an annular space 9.

The larger rod portion 5b contains a blind hole-like axial passage 10 from which a transverse passage 11 extends which provides for communication with the annular space 9.

The end face of the rod portion 5b forms, together with a planar bearing face 12 of the valve housing part 13 located below, a high-pressure-side valve flat seat 14. In the central valve housing part 15 there is a recess 16 which forms, with the valve housing part 13, a pressure relief space 17 from which a relief passage 18 extends laterally.

The axial passage 10 in the rod portion 5b is arranged coaxially with respect to a high-pressure-side passage section 19 which has a diameter of the same size and which leads to a passage 20 which is in communication with the rear of an injection nozzle (not illustrated).

The passage section 19, which includes a throttle 21 upstream of its juncture with the passage 20, is connected to a high-pressure space (not illustrated in greater detail) of a fuel injection system which operates according to the common rail principle and is shown, for example, in U.S. application Ser. No. 08/329,289.

In order to insure pressure compensation on the control rod, the opening cross-section F1 of the passage 20 adjacent the valve seat surface corresponds to the annular cross-section F2 formed at the pressure shoulder 5c.

The 2-way flat seat valve is shown in FIG. 1 in the closed position in which the control rod 5 is biased onto its valve seat exclusively by the return spring 8. It requires only small spring forces and small actuation forces of the electromagnet 6 to open the valve, that is, to lift the rod 5 off the valve seat 15 and to close the valve.

Figure 2:
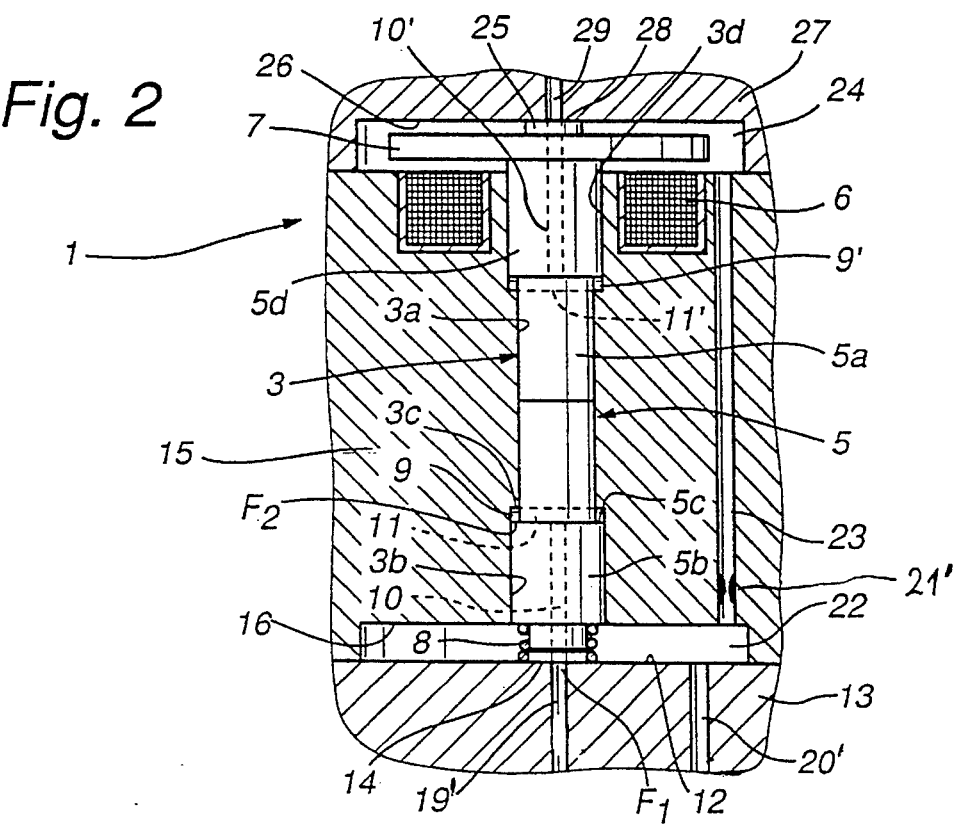
FIG. 2 shows a solenoid valve configured as a 3-way flat seat valve.

In FIG. 2, a pressure-compensated solenoid valve 1 is constructed as a 3-way flat seat valve which, in comparison with the embodiment according to FIG. 1, has a different passage arrangement and an additional enlarged rod portion 5d and an enlarged guide hole part 3d.

A passage 20' extends parallel to the high-pressure-side passage section 19' and both are in communication with one another via a pressure space 22 whenever the electromagnet 6 is not activated. This pressure space 22 is, via a connecting passage 23, in communication with a further pressure space 24 in which a flat armature 7 is disposed which, together with a protruding portion 25 thereof and a planar bearing surface 26 in the upper housing portion 27, forms a valve flat seat 28.

The enlarged rod portion 5d which adjoins the flat armature 7 has a bore arrangement and an annular space 9, like the annular space 9 formed at the enlarged rod portion 5b located below. The axial passage 10' also extends through the flat armature 7 and is directly in communication with a relief channel 29. The relief channel 29 or, as shown, the connecting passage 23, includes a throttle 21'.

In the illustrated position, the control rod 5 is biased in a sealing fashion with its flat armature 7 onto its valve flat seat 28 by the return spring 8 provided in the pressure space 17 located below. Thus, the high-pressure side is disconnected from the low-pressure side.

When the electromagnet 6 is energized, the control rod 5 lifts off from the valve flat seat 28 located above and closes the high-pressure-side passage section 19' located at the opposite end of the rod.

The high-pressure-side passage 19' is then closed, the space 22 now being in communication with the low-pressure-side relief passage 29, causing the nozzle needle of an associated fuel injection nozzle to open.

Also in this solenoid valve, the hydraulic forces which act on the control rod are completely pressure-compensated: When the rod is seated by the return spring 8 on the valve seat 28 the annular space 9' is in communication with the low-pressure relief passage 29 and when the control rod 5, upon energization of the electromagnet 6, is seated on the valve seat 14, the annular space 9 is in communication with the high-pressure-side passage section 19' providing on the shoulder 5c pressure forces compensating for the pressure forces applied to the control rod 5 by the high-pressure fluid in the passage section 19'.

What is claimed is:

1. A pressure-compensated solenoid valve for controlling communication through a connecting passage extending between a high fluid pressure side of a fuel injection nozzle and a low pressure fluid relief side, particularly between a high-pressure pump space of a fuel injection pump and a low-pressure fuel return space, said solenoid valve comprising a multi-part housing having a central part with a guide bore extending therethrough and having one end section of increased diameter providing for a bore shoulder, a stepped control rod movably disposed in said guide bore and having an increased-diameter end portion received in said increased-diameter end section of said guide bore and having a rod shoulder opposite said bore shoulder, a first valve housing end part disposed at one end of said central part and having a flat bearing surface with a valve opening disposed opposite said increased-diameter end portion of said control rod, a second valve housing end part disposed at the other end of said central part and including means for biasing said control rod onto said first valve housing end part for closing said valve opening, said control rod carrying at its end opposite said increased-diameter portion an armature arranged adjacent an electromagnet structure adapted to be energized for moving said control rod off said bearing surface for freeing said opening and releasing fuel under pressure therefrom, said increased-diameter portion including a passage disposed in alignment with said opening and extending to an annular space formed around said control rod between its shoulder and the shoulder of said guide bore to provide a pressure force on said control rod counteracting the pressure force generated by the fluid in the passage blocked by said control rod.

2. A solenoid valve according to claim 1, wherein said solenoid valve is constructed as a 2-way flat seat valve and the enlarged rod portion of the control rod bounds an annular relief space from which a low-pressure-side relief passage leads away, which relief passage, upon energization of the electromagnet, is placed in communication with a passage leading to the injection nozzle and also with a high-pressure-side passage section, which is provided with a throttle.

3. A solenoid valve according to claim 1, wherein the solenoid valve is constructed as a 3-way flat seat valve and additionally has an enlarged second armature-side rod end portion which, like the enlarged rod portion at its other end, is provided with an-axial passage leading to an annular space formed adjacent the enlarged second rod end portion, said axial passage extending through said armature for communication with a relief passage formed in said second housing end part adjacent said electromagnet.

4. A solenoid valve according to claim 3, wherein the enlarged rod portion which faces the first housing part bounds an annular high-pressure space in communication with a fuel injection nozzle controlled by said solenoid valve, and wherein a connecting passage extends from the high-pressure space to an armature space containing the flat armature.

5. A solenoid valve according to claim 1, wherein said flat armature has a projection with an end face which, with the second housing end part that bounds the armature space forms a low-pressure-side valve flat seat.

\* \* \* \* \*